Patented Feb. 20, 1945

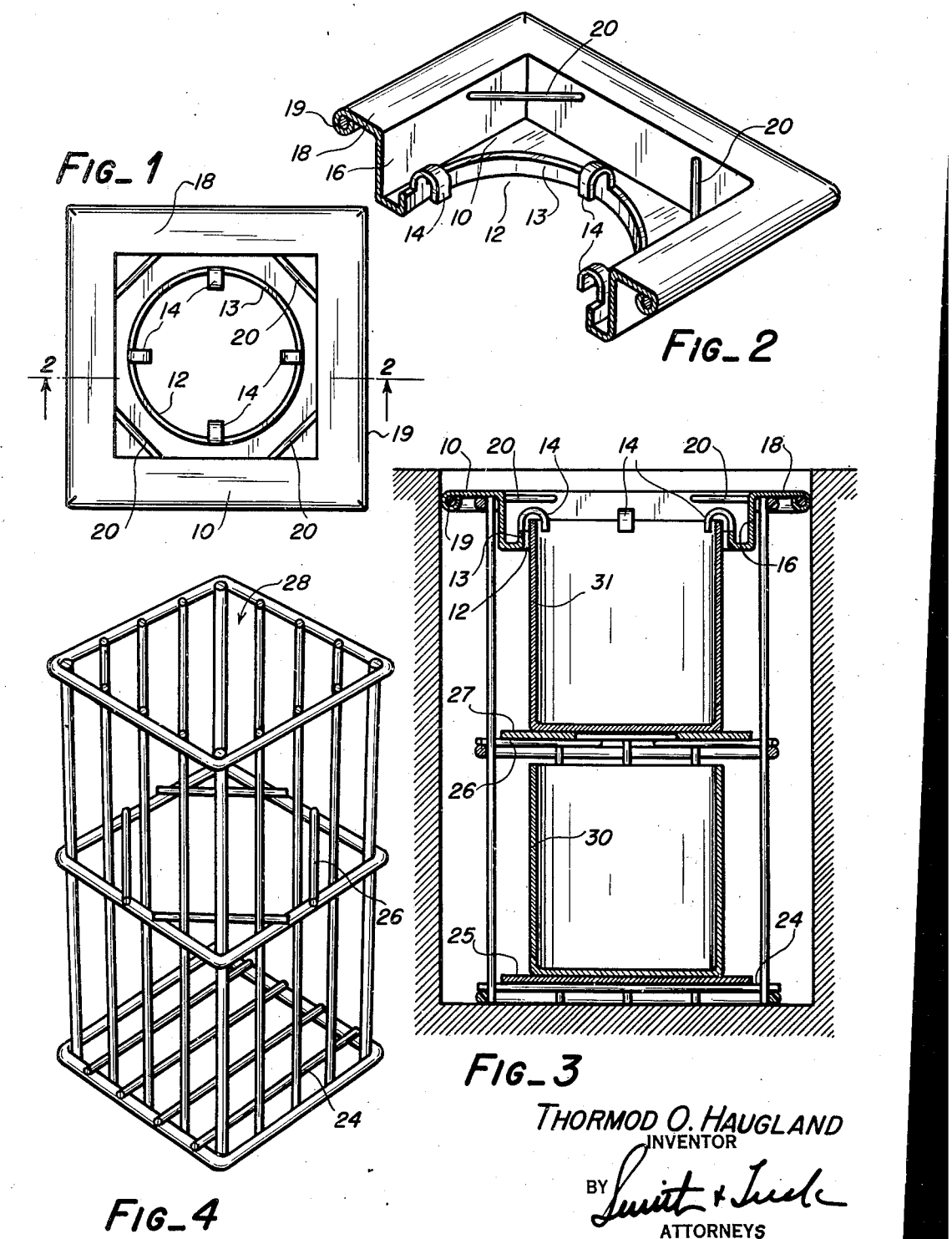

2,370,034

UNITED STATES PATENT OFFICE 2,370,034

REMOVABLE RIM FOR CONTAINERS

Thormod O. Haugland, Anacortes, Wash., assignor of one-half to Olof M. Haugland, Anacortes, Wash.

Application January 26, 1942, Serial No. 428,277

1 Claim. (Cl. 220—14)

This invention relates to a removable rim for containers and is particularly useful in connection with containers of frozen foods that are placed in refrigerated cabinets in a dispensing position, as in an ice cream cabinet.

It is customary in the handling of ice cream, for example, to deliver the product to a dispensing establishment in containers, usually cylindrical, but occasionally of other shapes, which, during the dispensing period are stored in a refrigerated cabinet having an upper opening for the purpose of dispensing the contents of the container.

An important object of my invention is to provide a removable rim for such containers which may be fitted thereto and fitted within such a refrigerated cabinet to prevent spillage of the ice cream or other products down into the lower portion of the cabinet and around the container. The essence of my invention for accomplishing the foregoing object is the provision of a panel having a central opening adapted to receive and enclose the mouth of such a container and provided with means for maintaining the panel in position with relation to the mouth of the container.

Another object of my invention is the provision of a removable rim for containers and supporting means to be placed in a storage cabinet to support dispensing containers and to effectively close off the interior of the cabinet from the outside air and in a manner that will prevent the dissipation of the refrigerated air from the cabinet and prevent the accidental introduction into the cabinet of foreign objects or spilled ice cream and the like.

Other objects and advantages of my invention will be mode apparent during the course of the following description wherein I have set forth and described the preferred and exemplifying form of my invention.

In the drawing:

Figure 1 is a plan view of my removable rim,

Figure 2 is a perspective view in cross-section of a rim for containers, portions of which have been omitted for convenience of illustration, Figure 3 is a vertical sectional view through a typical refrigerated cabinet showing a supporting rack and the usual containers, as well as my removable rim positioned therein, and Figure 4 is a perspective view of a rack which may be employed in connection with my invention.

The numeral 10 designates a panel having a central opening 12 which is adapted to receive and enclose the mouth of a container. While throughout the drawing I have shown the opening 12 as being circular, it will be understood that it could be shaped to fit a square, hexagonal, octagonal or other shaped container.

Down-turned hook means 14, spaced about the opening, support the panel by engagement over the edge of an upper open-mouth container substantially as is shown in Figure 3.

Rising around the edges of the panel 10 are upright walls 16 that may be outwardly flanged at 18 and have a rolled rim 19 to add strength to the panel. These flanges 18 increase the area within the cabinet occupied by my removable rim and preferably fit in the openings of the refrigerated cabinet.

Across the corners of the walls 16 are brace rods 20 which serve to strenthen the rim and also to provide convenient hand grip means for removing the rim from a container or from a cabinet.

In Figure 4 I show in perspective view a reticulated rack having a lower shelf 24, an intermediate shelf 26 and an upper open-mouth 28. While the rack has closed side walls above the upper shelf 26, containers may be placed on lower shelf 24 by being inserted through an open side wall shown in Figure 4. Auxiliary shelf plates 25 and 27 are shown in Figure 3 to be placed upon the members forming shelves 24 and 26 respectively for supporting containers such as 30 and 31.

When an upper container 31 is placed on the shelf 27 the panel 10 is fitted over the top so that the hooks 14 engage over the lip of the container and maintain it in position. Thus, when ice cream is dispensed from the container 31, if some is accidentally dropped outside of the container but inside of the cabinet, it is trapped on the flange 18 or upon the panel 10 itself. Should melting occur, any liquid will be trapped or contained upon the panel 10. A flange 13 is provided around the opening 12 so that when the rim is removed from a container and melted ice cream or other liquids are thereon, the liquid will not drain out through the opening during transportation to a sink or the like.

The removable rim, while it is shown in the drawing to be formed of sheet metal, may be formed of cardboard, wood, or be molded of any suitable plastic material available.

I claim:

A member for positioning and sealing a food container in the mouth of a refrigerated chamber and for the collection of droppings and the like, said member comprising a panel having an opening to surround the container, an upturned flange around said opening forming a collar for the food container, circumferentially spaced hooks integral with the upper edge of the upturned flange and extending upwardly and inwardly thereof to engage over the rim of a food container to support the flange and panel in position below the lip of the food container, an upright wall around the periphery of said panel and forming with said panel and said flange a sump for the collection of droppings, and a facing flange on said upright wall of substantially the size and shape of the mouth of the refrigerated chamber to close the same to prevent the passage of air currents into and out of the refrigerated chamber around the food container.

THORMOD O. HAUGLAND.